United States Patent
Kim et al.

(10) Patent No.: US 9,179,288 B2
(45) Date of Patent: Nov. 3, 2015

(54) SERVER IN CHARGE OF CONTROL PLANE WITHIN MOBILE COMMUNICATION NETWORK AND METHOD FOR CONTROLLING SERVICE IN SERVER

(75) Inventors: Taehyeon Kim, Gyeongki-do (KR); Laeyoung Kim, Gyeongki-do (KR); Saso Stojanovski, Paris (FR); Hyunsook Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 13/643,816

(22) PCT Filed: Apr. 29, 2011

(86) PCT No.: PCT/KR2011/003226
§ 371 (c)(1),
(2), (4) Date: Oct. 26, 2012

(87) PCT Pub. No.: WO2011/136617
PCT Pub. Date: Nov. 3, 2011

(65) Prior Publication Data
US 2013/0051327 A1   Feb. 28, 2013

Related U.S. Application Data

(60) Provisional application No. 61/389,269, filed on Oct. 3, 2010, provisional application No. 61/329,531, filed on Apr. 29, 2010.

(51) Int. Cl.
*H04W 4/00* (2009.01)
*H04W 8/08* (2009.01)
*H04L 29/12* (2006.01)
*H04W 60/04* (2009.01)

(52) U.S. Cl.
CPC ........... *H04W 8/082* (2013.01); *H04L 61/1588* (2013.01); *H04W 60/04* (2013.01)

(58) Field of Classification Search
None
See application file for complete search history.

(56) References Cited

U.S. PATENT DOCUMENTS

| | | |
|---|---|---|
| 2006/0034205 A1 | 2/2006 | Kim |
| 2010/0075659 A1 | 3/2010 | Kim et al. |
| 2011/0116469 A1* | 5/2011 | Bi et al. ................. 370/331 |
| 2011/0170469 A1* | 7/2011 | Watfa et al. .............. 370/312 |
| 2011/0170517 A1* | 7/2011 | Bakker et al. ............ 370/331 |

FOREIGN PATENT DOCUMENTS

| | | |
|---|---|---|
| KR | 10-2007-0043981 A | 4/2007 |
| KR | 10-2008-0030137 A | 4/2008 |
| KR | 10-2009-0055942 A | 6/2009 |

OTHER PUBLICATIONS

International Search Report issued in corresponding International Patent Application PCT/KR2011/003226 dated Dec. 22, 2011.

* cited by examiner

*Primary Examiner* — Christopher Crutchfield
*Assistant Examiner* — Alan Lindenbaum
(74) *Attorney, Agent, or Firm* — Morgan, Lewis & Bockius LLP

(57) ABSTRACT

According to the present description, data of a user can be detoured (offloaded) to a wired network such as a public communication network even through a Home (e)NodeB. In addition, when the data of the user is detoured (offloaded) to the wired network such as the public communication network even through the Home (e)NodeB, a local IP access (LIPA) service can be selectively supported according to the user or a UE.

12 Claims, 9 Drawing Sheets

SERVER IN CHARGE OF CONTROL PLANE WITHIN MOBILE COMMUNICATION NETWORK AND METHOD FOR CONTROLLING SERVICE IN SERVER

BACKGROUND OF THE INVENTION

1. Field of the Invention

The present invention relates to a server in charge of a control plane in a mobile communication network and a method of controlling services in the server.

2. Related Art

To respond to new technologies and various forums relating to 4G mobile communication, 3GPP, which defines technology standards for 3G mobile communication systems, started research on long term evolution (LTE)/system architecture evolution (SAE) technologies from later 2004 as a part of its effort to optimize and enhance performance of 3GPP technologies.

SAE, which is primarily led by 3GPP SA WG2, is a network technology directed toward supporting mobility between heterogeneous networks and determining the network structure together with the LTE task of 3GPP TSG RAN. Recently, SAE is one of critical issues regarding 3GPP standardization. For 3GPP systems to be able to support various radio access technologies based on IP, this task has been targeting optimized packet-based systems which can minimize transmission delay with enhanced data transmission capacity.

The SAE upper level reference model defined by 3GPP SA WG2 includes non-roaming cases and various scenarios of roaming cases, and their details are disclosed in 3GPP standard document TS 23.400a and TS 23.400b. One brief network structure is shown in FIG. 1

FIG. 1 is a view illustrating an evolved mobile communication network.

One critical feature of the network structure shown in FIG. 1 is that the network is based on a 2-tier model consisting of eNodeB of evolved UTRAN and gateway of core network. The eNodeB 20 includes, but not exactly comply with, the functions of a NodeB and RNC of the existing UMTS system, and the gateway may have the functions of SGSN/GGSN of the existing system.

Another critical feature is that a control plane and a user plane between an access network and a core network are exchanged with different interfaces. In the existing UMTS system, one interface is present between an RNC and an SGSN, whereas the mobility management entity (MME) 51 in charge of processing a control signal is separated in structure from the gateway (GW), so that two interfaces, S1-MME and S1-U, are used. The GW includes a serving gateway (hereinafter, 'S-GW') 52 and a packet network gateway (hereinafter, 'PDN-GW' or 'P-GW') 53.

FIG. 2 is a view illustrating a relationship between an (e)NodeB and a Home (e)NodeB.

In the 3G or 4G mobile communication systems, an effort to increase cell capacity goes on in order to support bilateral services and high-capacity services, such as multimedia content processing and streaming The growth of communication and multimedia technologies demands various high-capacity transmission technologies. To increase wireless capacity, more frequency resources may be assigned to users, but assignable frequency resources are limited.

To increase cell capacity, there is an approach of using higher frequency bandwidth and reducing cell coverage. When a cell with small cell coverage—such as pico cell—applies, a higher frequency band than that used in the existing cellular system may be used so that more information may be transmitted. However, more base station needs to be installed in the same area, thus resulting in costs increasing.

As a recent approach to increasing cell capacity using small cells, femto base stations, such as Home (e)NodeB 30, have been suggested.

Starting with RAN WG3 of 3GPP Home (e)NodeB, Home (e)Node 30 is recently being intensively researched by SA WG.

The (e)NodeB 20 shown in FIG. 2 corresponds to a macro base station, and the Home (e)NodeB 30 may be a femto base station. As used herein, the 3GPP terms are basically used, and the term "(e)NodeB" refers to NodeB or eNodeB. Further, the term "Home (e)NodeB" refers to Home NodeB or Home eNodeB.

The interface denoted in dotted lines is provided for control signal transmission between the (e)NodeB 20 and the Home (e)NodeB 30 and the MME 510. The interface denoted in solid lines is provided for data transmission of a user plane.

FIG. 3 illustrates problems with the conventional art.

As shown in FIG. 3, in case traffic at the interface between the (e)NodeB 20 and the S-GW 52 is under overload or congestion or in case traffic at the interface between the Home (e)NodeB 30 and the S-GW 52 is under overload or congestion, downlink data to the UE 10 or upload data from the UE 10 is not correctly transmitted.

Or, even in case the interface between the S-GW 52 and the PDN-GW 53 or interface between the PDN-GW 53 and an internet protocol (IP) service network of a mobile communication service provider is overloaded or congested, the downlink data to the UE 10 or upload data from the UE 10 may not be correctly transmitted.

Further, when UE is handed over from a current cell where the UE is serviced to another cell, if the other cell is in the overloaded state, the service to the UE may drop.

To address such problems, the mobile communication service providers upgrade the S-GW 52 and the PDN-GW 53 to high-performance ones or install new equipment. However, this may result in high costs. As times go by, the amount of data transmitted/received exponentially increases, thus causing overload.

Meanwhile, there are suggested various schemes to optimize the S-GW 52 and the PDN-GW 53 without further establishing mobile communication networks. For example, SIPTO has been suggested—a technology of transmitting specific IP traffic (e.g., internet services) of the UE through a selected optimal path in a macro access network and detouring, in a femto access network (e.g., Home (e)NB), it to a public network, not the mobile communication network—that is, along a path through nodes of a wired network—without transmitting or receiving it through the mobile communication network.

FIG. 4 illustrates the concept of selected IP traffic offload (SIPTO).

Referring to FIG. 4, there is shown a mobile communication system, such as evolved packet system (EPS). The EPS system includes an (e)NodeB 20, an MME 51, an S-GW 52, and a P-GW 53. Further, an Home (e)NodeB 30 is shown.

At this time, as shown, the SIPTO technology detours specific IP traffic (e.g. internet services) of the UE 10 to nodes of a wired network 70 without going through nodes in an IP service network 60 of a mobile communication service provider.

For example, if the UE 10 is allowed to access the (e)NodeB 20, the UE 10 generates a session for passing through the wired network 70, such as a public communication network, through the (e)NodeB 20 and may perform an IP network service through the session. At this time, a service provider's policy and enrollment information may be considered.

In order to be able to generate the session, a gateway—that is, a local gateway in charge of some of the functions of the GGSN in case of UMTS or a local gateway in charge of some of the functions of the P-GW in case of EPS—may be used as one being installed adjacent to the (e)NodeB 20.

As such, the local gateway is called local GGSN or local P-GW. The functions of the local GGSN or local P-GW are similar to those of GGSN or P-GW.

As described above, the SIPTO technology has suggested a concept of generating a session to detour (offload) UE data to a wired network, such as a public communication network, through the (e)NodeB 20, i.e., a macro base station.

However, the conventional SIPTO technology still leaves some problems when the (e)NodeB 20 is overloaded since the technology allows users' data to pass through the macro base station, i.e., the (e)NodeB 20.

SUMMARY OF THE INVENTION

Accordingly, this disclosure aims to suggest a technology of enabling users' data to detour (offload) to a wired network, such as a public communication network, through the Home (e)NodeB.

To achieve the above objects, this disclosure suggests a technology that enables a user's data to be detoured (offload) to a wired network, such as a public communication network, even through a Home (e)NodeB.

On the other hand, the Home (e)NodeB may also support an local IP access (LIPA) service. The LIPA service is a service that enables UE to transmit and receive data data through a path passing through nodes included in a local network (home network or corporate office network) through the Home (e)NodeB.

However, even when no LIPA service is permitted to specific UE according to current access circumstances (CSG, Home (e)NodeB, etc.), if SIPTO to the specific UE is enabled, the specific UE may happen to utilize the LIPA service as well.

Accordingly, this disclosure suggests a technology that enables LIPA service to be selectively supported according to the user or UE when supporting SIPTO through the Home (e)NodeB.

Specifically, this disclosure provides a method of controlling a service in a server in charge of a control plane in a mobile communication network. The method may include receiving a first message including one or more of a parameter indicating an identifier of a local gateway and an selected IP traffic offload (SIPTO) service-related indicator from a Home (e)NodeB. The first message may include a request message by a terminal. The method may include, upon receiving the first message, determining whether to provide an SIPTO service to the terminal in consideration of one or more of information indicating whether to accept the SIPTO service by the terminal, the identifier of the local gateway, and the SIPTO service-related indicator, in case of providing the SIPTO service, determining whether to provide a local IP access (LIPA) service to the terminal, transmitting LIPA service permission information or filter information to the local gateway depending on the determination, and transmitting one or more of the LIPA service permission information, the filter information, and a notification for the LIPA service to the Home (e)NodeB depending on the determination. The LIPA service permission information or the filter information may be used to determine whether the Home (e)NodeB or local gateway should block data from the LIPA service generated by the terminal. The notification for the LIPA service may be used to inform the terminal of whether the LIPA service is permitted.

The request message by the terminal may include one or more of a tracking area update (TAU) request message, a radio area update (RAU) request message, a handover request message, and an attach request message.

The SIPTO service-related indicator may indicate whether the Home (e)NodeB is able to provide the SIPTO service. The LIPA service permission information may indicate whether provision of the LIPA service to the terminal is permitted.

The information on whether to accept the SIPTO service by the terminal may be included in the request message by the terminal and received, or may be obtained from subscriber information.

The LIPA service permission information or filter information transmitted to the local gateway may be included in a session generation request message and transmitted.

One or more of the LIPA service permission information, the filter information and the notification for the LIPA service transmitted to the Home (e)NodeB may be included in a connection acceptance message and transmitted.

The method may further include, after the determination, transmitting a session delete request message to a serving gateway, receiving a session delete response message from the serving gateway, transmitting a bearer deactivation request message to the terminal, and receiving a connection request message from the terminal.

After receiving the connection request message from the terminal, the transmitting to the Home (e)NodeB and transmitting to the local gateway may be performed.

In a case where the bearer deactivation request message is transmitted to the terminal, a message that requests deletion of existing packet data network (PDN) connection and reconnection may be transmitted or a message that requests deletion of the existing PDN connection and use of existing LIPA PDN may be transmitted.

Meanwhile, this disclosure provides a server of controlling a service, the server in charge of a control plane in a mobile communication network.

The server may include a transmission/reception unit configured for receiving a first message including one or more of a parameter indicating an identifier of a local gateway and an selected IP traffic offload (SIPTO) service-related indicator from a Home (e)NodeB. The first message may include a request message by a terminal.

The server may further include a controller configured for, upon receiving the first message, determining whether to provide an SIPTO service to the terminal in consideration of one or more of information indicating whether to accept the SIPTO service by the terminal, the identifier of the local gateway, and the SIPTO service-related indicator, and in case of providing the SIPTO service, determining whether to provide a local IP access (LIPA) service to the terminal The transmission/reception unit may be configured for transmitting LIPA service permission information or filter information to the local gateway, and transmitting one or more of the LIPA service permission information, the filter information, and a notification for the LIPA service to the Home (e)NodeB depending on the determination of the controller.

The LIPA service permission information or the filter information may be used to determine whether the Home (e)NodeB or local gateway should block data from the LIPA service generated by the terminal. The notification for the LIPA service may be used to inform the terminal of whether the LIPA service is permitted.

The request message by the terminal may include one or more of a tracking area update (TAU) request message, a radio area update (RAU) request message, a handover request message, and an attach request message.

The SIPTO service-related indicator may indicate whether the Home (e)NodeB is able to provide the SIPTO service. The LIPA service permission information may indicate whether provision of the LIPA service to the terminal is permitted.

The information on whether to accept the SIPTO service by the terminal may be included in the request message by the terminal and received, or is obtained from subscriber information.

The LIPA service permission information or filter information transmitted to the local gateway may be included in a session generation request message and transmitted.

One or more of the LIPA service permission information, the filter information and the notification for the LIPA service transmitted to the Home (e)NodeB may be included in a connection acceptance message and transmitted.

According to this disclosure, the user's data may be detoured (offload) to the wired network, such as public communication network, even through the Home (e)NodeB.

Meanwhile, when the user's data is detoured (offload) to the wired network, such as public communication network, even through the Home (e)NodeB, LIPA service may be selectively supported depending on the user or UE.

DESCRIPTION OF EXEMPLARY EMBODIMENTS

Figure 1:
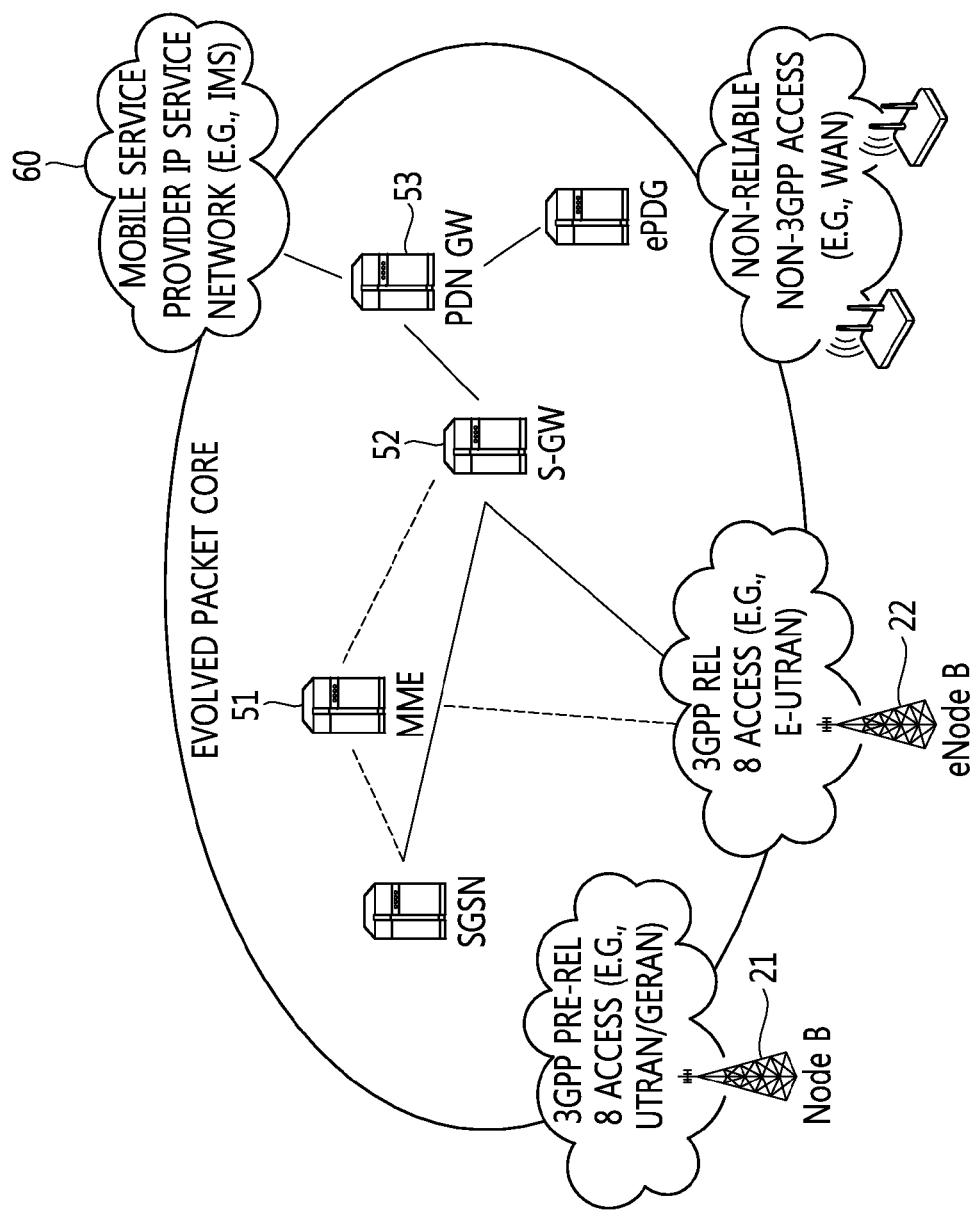
FIG. 1 is a view illustrating a structure of an evolved mobile communication network.
Figure 2:
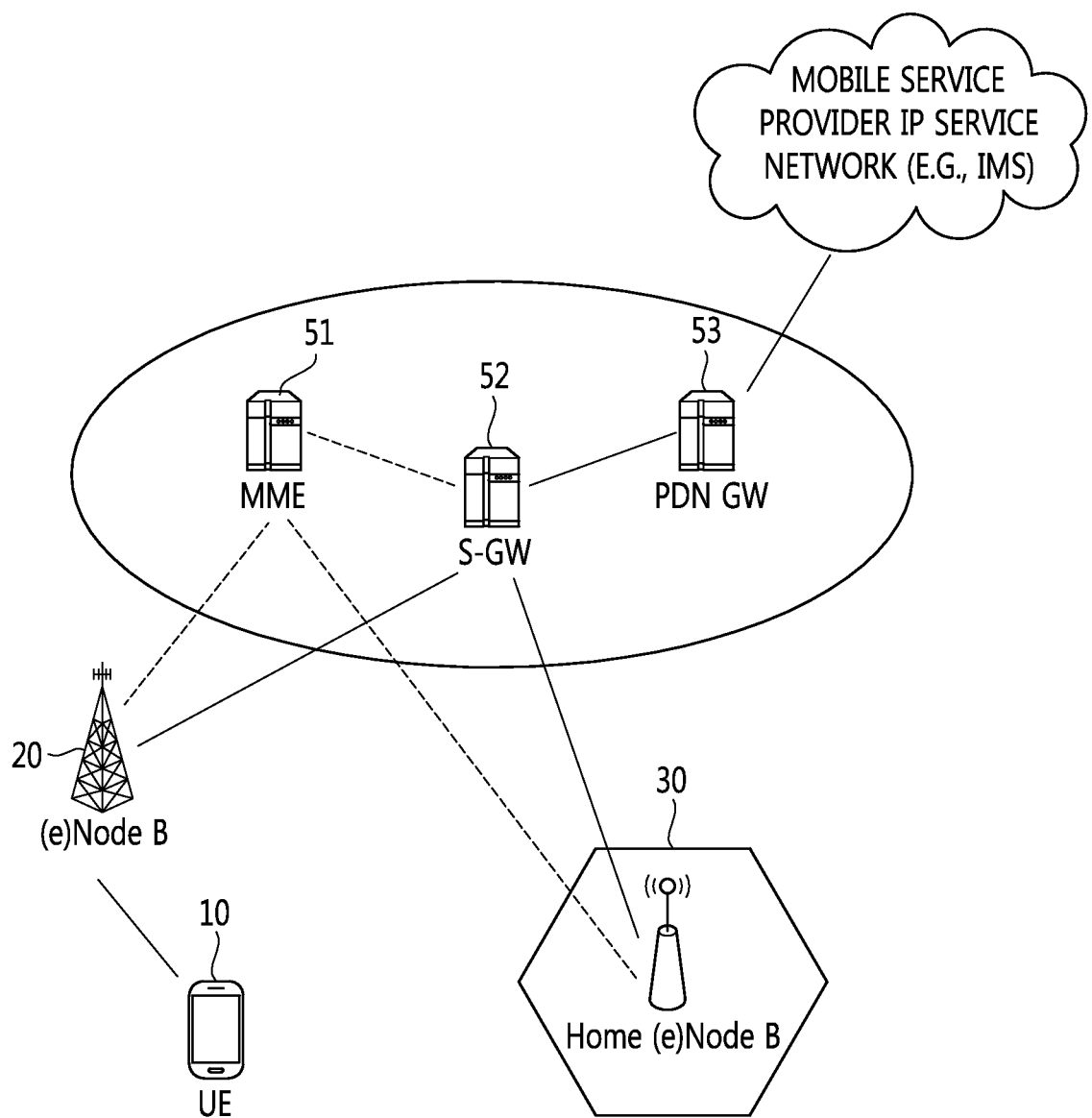
FIG. 2 is a view illustrating a relationship between an (e)NodeB and an Home (e)NodeB.
Figure 3:
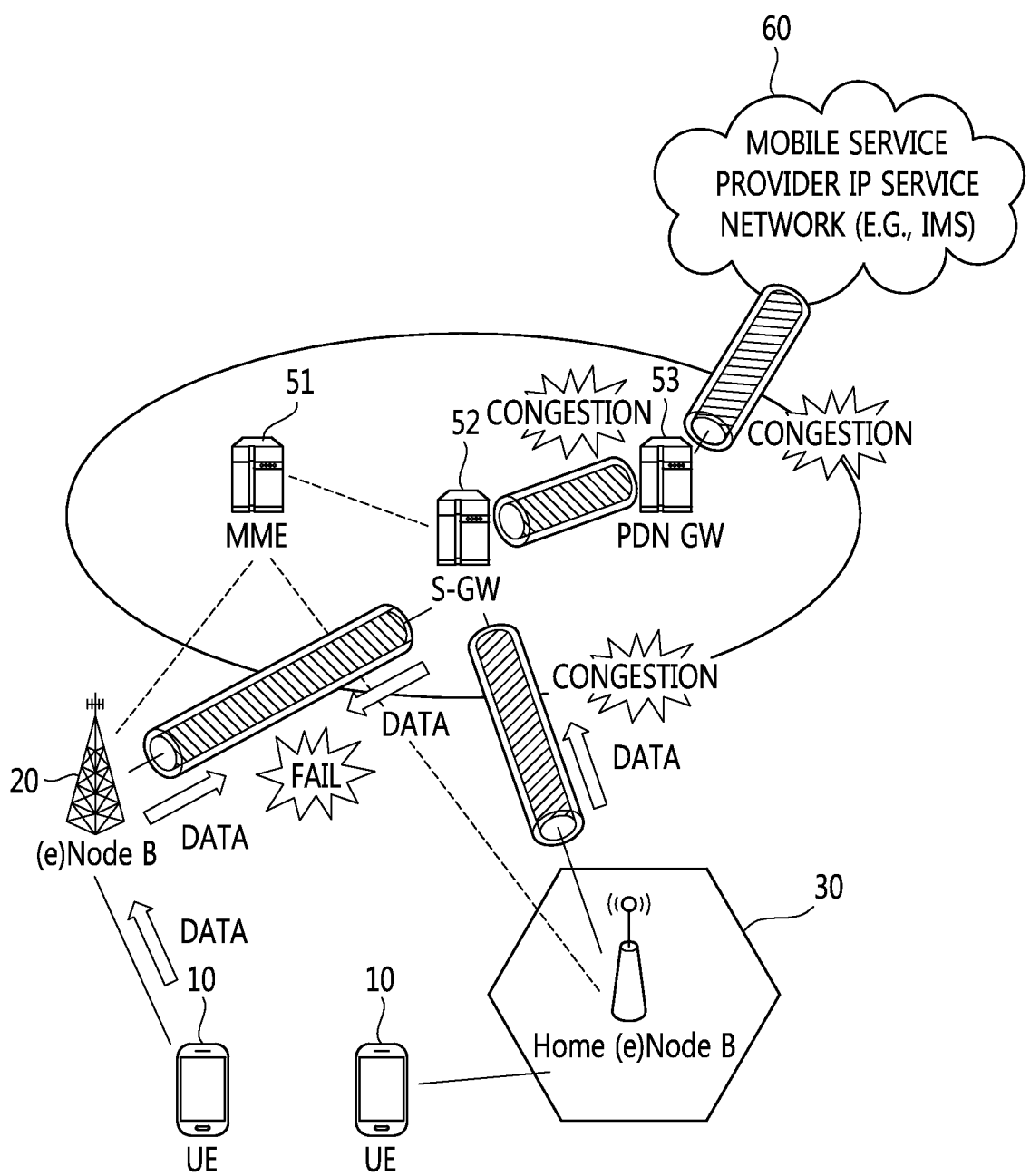
FIG. 3 shows problems with the conventional art.
Figure 4:
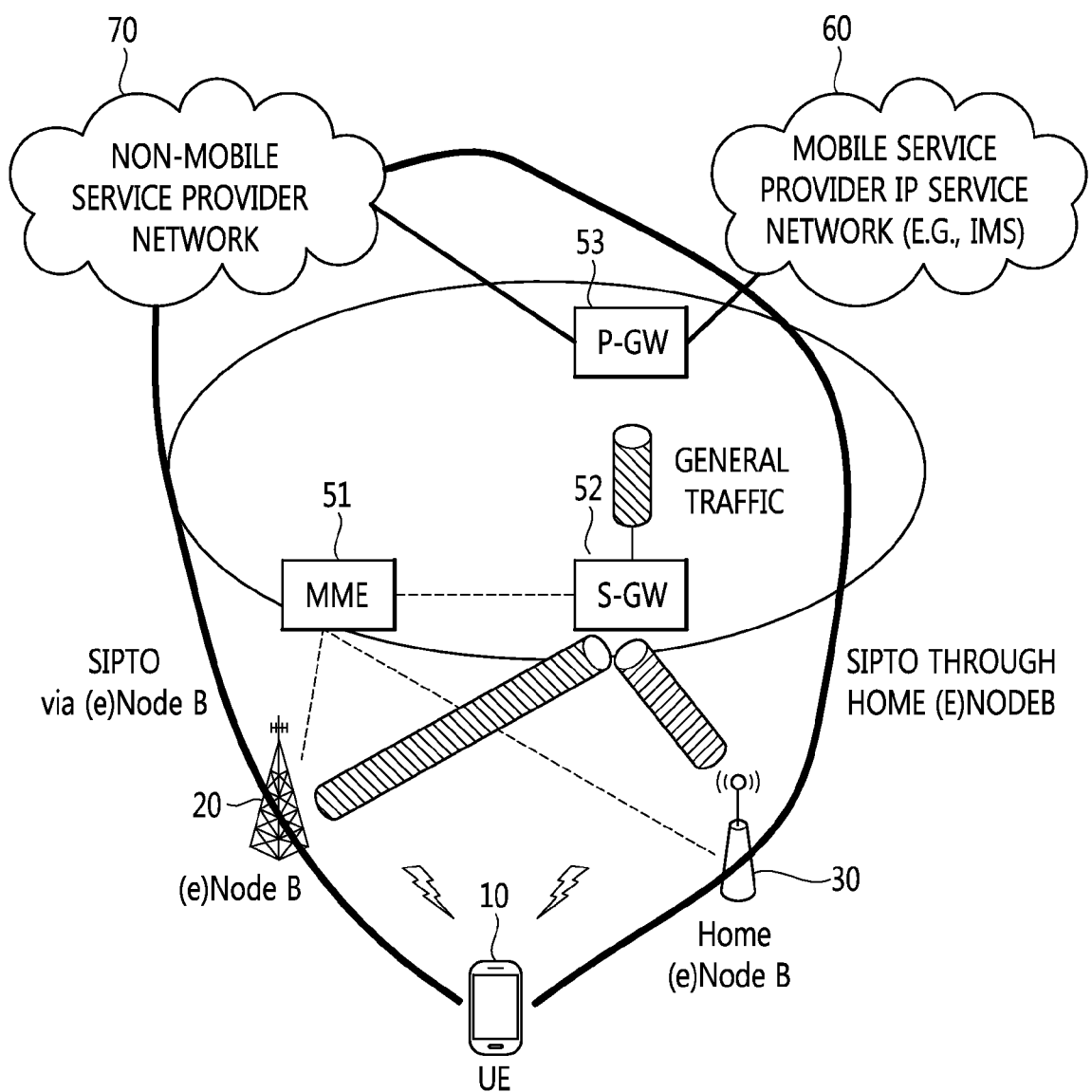
FIG. 4 shows the concept of SIPTO (Selected IP Traffic Offload).

The present invention is described based on an universal mobile telecommunication system (UMTS) and an evolved packet core (EPC), but the present invention is not limited to such communication system, and may also apply to all communication systems to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

Although user equipment (UE) is shown in the drawings, the shown UE may be also referred to by other terms, such as 'terminal' or 'mobile equipment (ME)'. Further, the UE may be a portable device, such as a laptop computer, a mobile phone, a PDA, a smart phone, or a multimedia device, or a non-portable device, such as a PC or a car-mounted device.

DEFINITION OF TERMS

Prior to going further to the description taken in conjunction with the drawings, the terms used herein are briefly defined for ease of understanding.

UMTS: abbreviation of Universal Mobile Telecommunication System. Means the 3G mobile communication network.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

Access control: control process to permit an access system, such as Home (e)NodeB to use UE or to move it to another access system.

TEID (tunnel endpoint identifier): End point ID of a tunnel configured between nodes in a network, configured per period on a per UE bearer basis.

NodeB: base station in an UMTS network. Installed outside the building. The cell coverage corresponds to that of a macro cell.

eNodeB: base station of EPS. Installed outside the building. The cell coverage corresponds to that of a macro cell.

(e)NodeB: indicates NodeB or eNodeB.

Home NodeB: base station in an UMTS network. Installed in the building. The cell coverage corresponds to that of a femto cell.

Home eNodeB: base station in an EPS network. Installed in the building. The cell coverage corresponds to that of a femto cell.

Home (e)NodeB: indicates Home NodeB or Home eNodeB.

Home (e)NodeB gateway: connected to one or more Home (e)NodeBs. Gateway interfacing with core network.

Home (e)NodeB Subsystem: form of managing a wireless network by bundling an Home (e)NodeB and an Home (e)NodeB Gateway into one set. The Home (e)NodeB sub system and the Home (e)NodeB both manage a wireless network and interworks with the core network, so that they may be considered single aggregation. Accordingly, hereinafter, the terms "Home (e)NodeB" and "Home (e)NodeB sub system" are used as well.

MME: abbreviation of Mobility Management Entity. Functions to control each entity in the EPS to provide mobility and session for the UE.

Closed subscriber group (CSG): means one or more Home (e)NodeBs. Home (e)NodeBs belonging to the CSG have the same CSG ID. Each user receives usage permission per CSG.

Closed access mode: means that Home (e)NodeB operates as a CSG cell. Also means that the operation is done in such a manner that access to the corresponding cell is allowed only for permitted user equipment. That is, only terminals with an authority for specific CSG IDs, which are supported by the Home (e)NodeB, may gain access.

Open access mode: means that the operation is done in such a manner as a normal cell or non-CSG cell without the concept of CSG. That is, means that it operates like the general (e)NodeB.

Hybrid access mode: means that the Home (e)NodeB operates as CSG cell but allows non-CSG subscribers to gain access. By permitting access to user equipment with a specific CSG ID supportable in the corresponding cell, may provide an Home (e)NodeB service and operates in such a manner as permitting access to terminals with not CSG authority as well.

Selected IP traffic offload (SIPTO): technology in which when UE transmits specific IP traffic through the Home (e)NodeB or (e)NodeB, in case of (e)NodeB, selecting an optimal path and then performing transmission, and in the Home (e)NodeB, detouring it to a wired network, such as Internet, not to a mobile communication service provider's network (for example, 3GPP or 3GPP2).

Local IP access (LIPA): technology of connecting the Home (e)NodeB to a local network (i.e., small network, e.g., home network or firm network) and allowing UE in the Home (e)NodeB to access the local network via the Home (e)NodeB.

Local gateway: gateway for enabling the LIPA or SIPTO through the Home (e)NodeB, that is, for enabling transmission of data directly to a home network or wired network without passing through a core network. The local gateway is positioned between the Home (e)NodeB and the wired network, and a bearer is generated between the Home (e)NodeB and the wired network or between the Home (e)NodeB and the local network, so that data transmission may be done through the generated bearer.

Session: path for data transmission, and its unit may be PDN, bearer, or IP flow. Differences between the units may be divided into an overall target network unit (APN or PDN unit), a unit separated with QoS therein (bearer unit), and a destination IP address unit as defined in 3GPP.

PDN connection: refers to connection from a terminal to PDN, i.e., correlation (connection) between a terminal represented in an IP address and PDN represented in APN. This means connection (terminal-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

Meanwhile, hereinafter, a scheme suggested in this disclosure will be briefly described.

Description on a Scheme for Providing SIPTO Service in Home (e)NodeB

According to this disclosure, in a mobile communication system, such as 3GPP UMTS/EPS, an architecture is suggested for detouring (selected IP traffic offload) specific IP traffic (e.g., internet service) of UE through the Home (e)NodeB to a path going through nodes in a public network, i.e., wired network, not the mobile communication network.

This will be described with reference to FIG. 5.

Figure 5:
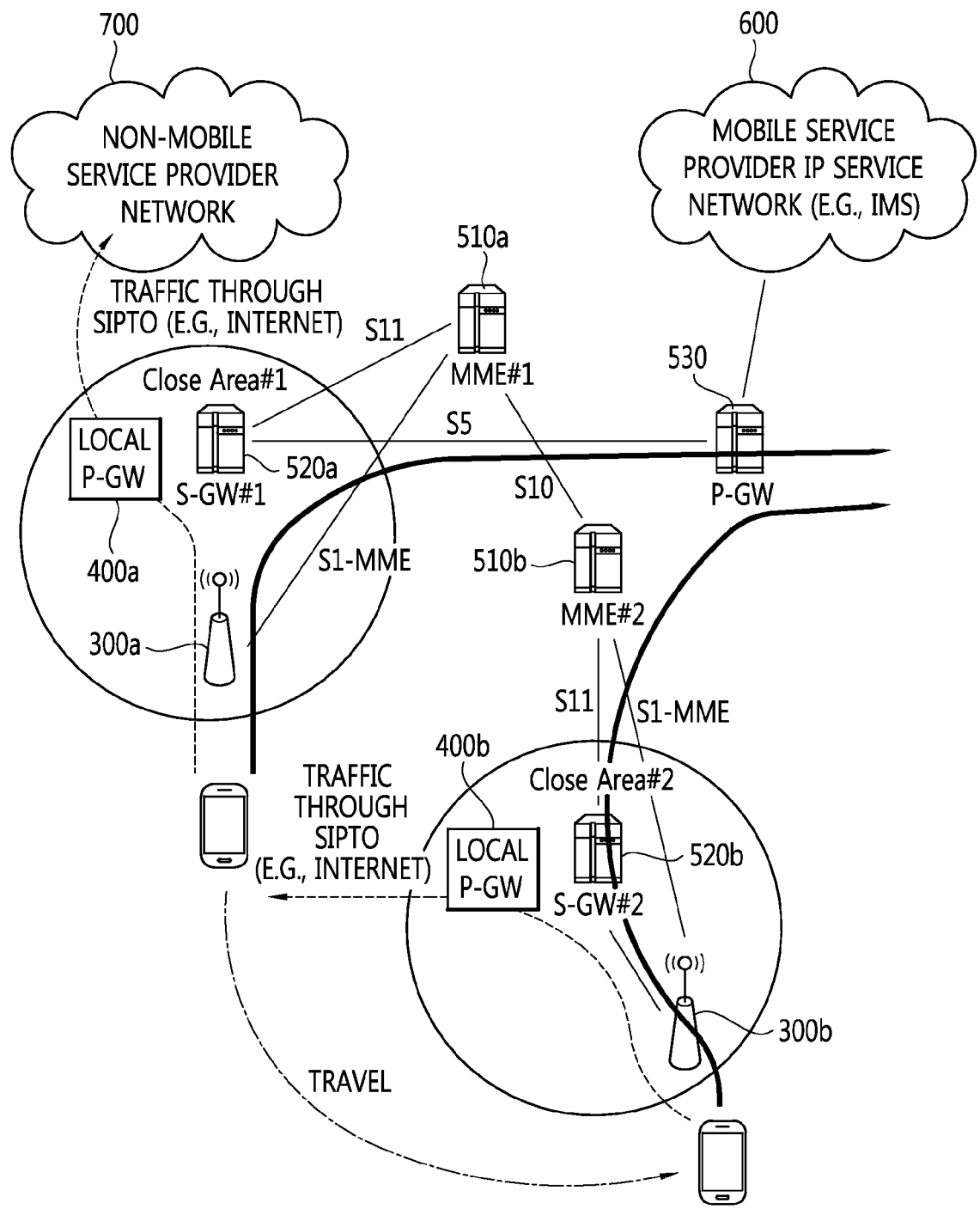
FIG. 5 shows an example of an architecture suggested in this disclosure.

FIG. 5 shows an example of an architecture suggested herein.

Referring to FIG. 5, there is shown a mobile communication system, such as, e.g., EPS. The EPS system includes a source base station 300a, a target base station 300b, a source local P-GW 400a, a target local P-GW 400b, a source MME 510a, a target MME 510b, a source S-GW 520a, a target S-GW 520b, a source P-GW 531, and a target P-GW 532. The source base station 300a and the target base station 300b may be an (e)NodeB or Home (e)NodeB.

The base stations 300a and 300b (hereinafter, collectively referred to as '300'), the MMEs 510a and 510b (hereinafter, collectively referred to as '510'), the S-GWs 520a and 520b (hereinafter, collectively referred to as '520'), and the P-GWs 531 and 532 (hereinafter, collectively referred to as '530') are based on EPS.

The local gateways 400a and 400b (hereinafter, collectively referred to as '400') are positioned between the base station 200 and the wired network 700, and are gateways that enable SIPTO through the base station 300. The local gateway 400 may generate a session through a path between the base station 300 and the wired network 700 and enables data transmission through the generated bearer.

The local gateway 400 may include all or some of the functions of PDN-GW for EPS system or may include all or some of the functions of GGSN (Gateway GPRS Support Node). However, the local gateway 400 may generate a bearer through a path between the base station 300 and the wired network 700 and thus is distinguished from the P-GW 520 of EPS or the GGSN of UMTS which generates a bearer through a path to the mobile communication network 600, so that it can be called local P-GW in EPS or GGSN in UMTS.

Meanwhile, although the system shown in FIG. 5 is based on EPS, the SIPTO shown in FIG. 5 may also apply to 3GPP UMTS. In the 3GPP UMTS, the function of the control plane of the MME 510 and the function of the user plane of the S-GW 520 both may be performed in a serving GPRS support node (SGSN) (not shown).

Referring to FIG. 5, the operation is described below.

If the UE 100 requests a service, the SGSN or MME which is a control entity in the core network determines whether to detour the data of the service requested by the UE 100 to the wired network 700. At this time, an access point provided through the wired network 700, such as a public network, may be the same as the mobile communication network 600. That is, an access point name (APN) may be identically used which represents the name of the access point and SIPTO permission may be separately designated to each APN.

As such, a specific APN is provided to an entity in the core network when the UE 100 attempts access, and whether to detour (offload) access of the UE 100 to the nodes of the wired network 700, such as the public network, may be determined by, e.g., MME 510 of EPS or SGSN of UMTS. At this time, the control entity in the core network, for example, the MME 510 may determine whether to detour the data by the requested service to the wired network 700, such as the public network, in consideration of whether the base station which the UE 100 accesses is an (e)NodeB or Home (e)NodeB and whether the base station supports SIPTO.

If the data is determined to be detoured, the session for the data of the service is set to be detoured via the wired network 700. In other words, the source MME 510a may identify the parameter in the UE context—for example, SIPTO_Session_indicator—in order to determine whether the session for the data transmitted/received to/from the UE 100 is a session based on a wireless period with the source base station 300a, e.g., Home (e)NodeB, and a wired period with the source local gateway (i.e., local-GGSN or local P-GW) 400a.

In case of providing mobility for the ongoing session, the existing mobility procedure is followed, and the source MME 510a determines a proper target MME 510b, and transfers UE context to the determined target MME 510b, wherein a parameter indicating whether the ongoing session is based on SIPTO—for example, SIPTO_Session_indicator—may be included when transmitted or HSS which is a subscriber information server may be requested to be able to receive SIPTO_Session_indicator based on the UE context.

Then, the target MME 510b may determine whether to maintain the SIPTO-based session in consideration of whether the target base station 300b supports SIPTO, service provider's policy, or QoS.

Further, in case the UE travels into the coverage of the target base station 300b, the local P-GW or local GGSN through which the data of the UE 100 passes needs to be likely changed. In such case, radio access capacity, QoS required for the session, and mobility should be considered.

If the local P-GW or local GGSN needs to be changed, the source MME 510a or SGSN cuts (terminates) the current session by transferring such reasons to the UE 100 so that it may be induced to request a new session. Such induction may be done by an MME or SGSN for the source base station or by an MME/SGSN for the target base station.

An architecture suggested herein has been described to provide the SIPTO service through Home (e)NodeB. Hereinafter, a scheme will be described which selectively supports an local IP access (LIPA) service depending on a user or UE when supporting the SIPTO service through Home (e)NodeB.

Description of a Scheme for Selectively Supporting an LIPA Service when Supporting the SIPTO Service through Home (e)NodeB According to this disclosure, a technology that enables selective support for the LIPA depending on the user or UE when SIPTO is supported through Home (e)NodeB is suggested.

1. What is Necessary to Implement Such Technology is Summarized as Follows:

Description of Functions for LIPA Service
a) may support a stand-alone gateway (GW) separated from Home (e)NodeB to which UE is attached
b) may support mobility of UE between Home (e)NodeBs positioned in a local network
c) may notify a user of whether LIPA service is available by Home (e)NodeB 2. Description of Functions for SIPTO in a Local Network
a) additional functions to an architecture defined for LIPA service (for example, in case a service is activated or inactivated as LIPA, or further in case of all allowed or prohibited cases, SIPTO service may be provided over a local network)
b) when SIPTO service is performed over a local network, may support mobility between Home (e)NodeB and (e)nodeB, i.e., between macro base stations
c) may define a policy for SIPTO per APN, may define a policy for SIPTO per IP flow under any APN, or may define a policy for SIPTO per IP flow under a specific APN
d) service provider's settings for policy of SIPTO service may be statically or dynamically changed
e) user may accept or decline the SIPTO service before traffic detours.

Meanwhile, when SIPTO is supported through Home (e)NodeB, the following information needs to be enhanced so as to selectively provide LIPA service in consideration of access circumstances (whether to subscribe CSG or whether to permit Home (e)NodeB and LIPA).

1. Subscriber Information

The subscriber information is recorded in a home subscriber server (HSS) or a home location register (HLR). As described earlier, even though LIPA service is not allowed, SIPTO service may be allowed. Accordingly, whether to permit one PDN connection for LIPA service and SIPTO service may be defined in the subscriber information.

Further, information on whether UE accepts may be necessary. Such information may be transferred upon access or may be added to the subscriber information. In case it is recorded in the subscriber information, interaction with UE may be skipped, thus ensuring quicker process. For this purpose, the HSS or HLR provides information on accept or decline to MME. Recording to HSS or HLR may be done by the Internet or an individual server.

The following Table 1 shows the subscriber information that includes information on whether to accept LIPA service and SIPTO service.

TABLE 1

| Subscription |
| --- |
| 1) CSG Subscription Data |
|    CSG IDs (APN) |
| 2) VPLMN LIPA Allowed |
| 3) Each PDN |
|    a) SIPTO permissions |
|    b) LIPA permissions |
|    LIPA-prohibited, LIPA only, LPA-conditional |
|    c) SIPTO acceptance |
|    acceptance, decline |

Meanwhile, when supporting SIPTO through Home (e)NodeB, to selectively provide LIPA service considering access circumstances (whether to subscribe CSG and whether to permit Home (e)NodeB and LIPA), each necessary Home (e)NodeB, UE, and MME should be corrected or changed as follows.

1. Home (e)NodeB 1-1) Home (e)NodeB 300 that Supports LIPA and SIPTO Should Provide MME 510 with Information on its Capacity a) in case of Home (e)NodeB having the functions of local gateway (Local-GW) (so-called collocated L-GW)

An indicator indicating whether to be able to provide SIPTO service—for example, SIPTO capability indicator—is transmitted to the MME. This is possible by providing information on the address of the local-gateway (Local-GW). If one Home (e)NodeB distinguishes LIPA service from SIPTO service, SIPTO capability indicator or LIPA capability indicator are also transmitted. This is additional information necessary for MME to separately process each function.

b) in case local gateway is provided separately from Home (e)NodeB

That the local-gateway is provided separately from Home (e)NodeB 300 is a new requirement that is not included in Rel-10. As such, in case they are provided separately, Home (e)NodeB may not know the address of the local-gateway, and thus, as described above, the address information may not be transmitted to MME. Accordingly, capability information on whether LIPA service and SIPTO service is available may be transmitted to MME by a service provider's or Home (e)NodeB owner's settings. As such, by providing capability information on whether the LIPA service and SIPTO service is possible, when support is impossible, additional signal transmission and reception may not be done.

1-2) Notification for LIPA Service May Be Made to UE 100

Home (e)NodeB 300 may inform the UE 100 of whether the UE 100 may gain IP access to a residential network or corporate network. This may be transferred before or after the UE 100 is attached to the network, for example, before or after an attach request message is transmitted to the MME 510.

Before attach, it is known through a broadcast message. The UE 100 may include information on SIPTO accept or decline in the broadcast message when performing transmission. For this, the UE 100 may previously store SIPTO accept or decline information. Alternatively, if sending an inquiry to a user and then receiving permission from the user, the information may be transmitted.

After attach is complete, it may be included in non-access stratum (NAS) or AS message and transmitted.

1-3) In Case LIPA Service is Not Provided, LIPA Traffic by UE May Be Screened.

Even when no LIPA service is offered, to provide the SIPTO service, usage of local-gateway is needed. Due to this, some problem may occur that the UE 100, in spite of not being able to use LIPA service, may happen to transmit data to a small network connected with the Home (e)NodeB 300—for example, home network. That is, since the process of forming a session for SIPTO (SIPTO PDN connection) is the same as the existing session for LIPA (LIPA PDN connection), if the session for SIPTO is generated, transmission of LIPA traffic may, although not intended, be possible. To address such problem, traffic for LIPA service should be dropped or screened. For this, an entity in the core network—for example, MME 510 or SGSN—may transmit an indicator to indicate that LIPA has not been permitted—for example, LIPA permission indicator—to the Home (e)NodeB or local-gateway. Or, the entity in the core network—for example, MME or SGSN—may transmit a filter rule (e.g., target ip address, etc.) for traffic passing through a small network, e.g., home network, so that the Home (e)NodeB may cut off traffic attempting to get through the home network.

Information required for this purpose is as follows:

TABLE 2

| Information transmitted from Home (e)NodeB to MME: |
| --- |
| in case of Home (e)NodeB having the addressing function of local gateway (so-called Collocated Local-GW))<br>SIPTO capable indicator |
| Information received from MME by Home (e)NodeB |
| whether to permit LIPA (LIPA permission) |
| Information transmitted from Home (e)NodeB to UE |
| notification for LIPA service (LIPA notification) |

Meanwhile, UE should be changed as follows.

2. UE

The UE 100 provides information on acceptance or decline of the SIPTO service to the MME 510. After receiving the information, the MME 510 compares it with other pieces of information to determine whether to be going to provide SIPTO service through the Home (e)NodeB 300.

The time that the UE 100 transfers the information follows what has been described above. Further, the above information may be recorded in the subscriber information of the HSS 540 or HLR. The information indicates whether a user of UE in the current Home (e)NodeB accepted the SIPTO service irrespective of whether the LIPA service is accepted. Such information may be set in advance. Or, once configured, such information may be reused later.

Meanwhile, the UE 100 receives a notification for the LIPA service and may use this. In case the LIPA service is not allowed, the UE 100 may not transmit LIPA traffic. For this purpose, the UE 100 does not transmit LIPA traffic through the corresponding PDN without the LIPA service notification to the corresponding PND. For this, the MME may transfer the notification for the LIPA service to the UE 100 per PDN. Further, the Home (e)NodeB 300 may transfer the notification for the LIPA service to the UE 100 on a per-radio access basis. Or, the UE 100 may receive an indicator indicating that LIPA is not allowed or information on a corresponding IP flow-based non-allowed filter from the MME 510 or Home (e)NodeB 300 and may transmit data based on it.

The following Table 3 summarizes the UE operations.

TABLE 3

| Information transmitted from UE to MME |
| --- |
| whether to accept SIPTO (SIPTO acceptance):<br>indicates accept or decline |

Meanwhile, after happening to be able to receive the SIPTO service through the Home (e)NodeB 300, the UE 100 detours (offload) its own data to the public network based on various pieces of information, for example, policy information. Such policy information is previously transferred (statically or dynamically) to the UE 100 and stored.

Meanwhile, the MME 510 should be changed as follows.

3. MME 3-1) Determine Whether to Apply to Providing SIPTO Service through Home (e)NodeB The MME 610 determines whether to provide SIPTO service through the Home (e)NodeB based on the above-described information from the UE 100, the above-described information from the Home (e)NodeB 300, and the above-described subscriber information. Specifically, the MME may consider the following information.

a) inquiry to the UE 100 on whether to receive the SIPTO service

If the UE 100 transfers information on whether to accept the SIPTO service when performing an Attach procedure (i.e., when the UE 100 sends an Attach request message to the MME 510), the MME 510 uses the transferred information.

when the Attach procedure by the UE 100 is complete (i.e., when an attach accept message is transmitted to the UE) or when the LIPA service is complete (for example, PDN connectivity Accept message is transmitted to the UE), the message transmitted to the UE includes an indicator for inquiring whether to receive the SIPTO service.

3-2) Operation with LIPA PDN

If there is already PDN connection for LIPA, PDN connection for SIPTO may be combined with the PDN connection for LIPA. If there is a setting for PDN connection for SIPTO to the macro access network, the connection is deleted, and may be integrated with the PDN connection for LIPA. For this, integrated context may be generated. That is, the context for SIPTO is updated to LIPA PDN.

3-3) Inform UE that SIPTO Service Through Home (e)NodeB is Available

If it is determined to provide the SIPTO service through the Home (e)NodeB, the MME 510 instructs deletion of, if any, PDN for SIPTO that has been previously generated in the UE 100.

A) further, if there is no setting for PDN connection for LIPA service, and it is determined to generate PDN connection for SIPTO, the MME 510 releases PDN connection of the core network and transfers a deactivation request message (e.g., deactivate bearer request message) to request deactivation with reactivation to the UE 100. The UE 100 may send a request to the MME 510 using the same PDN (APN) as PDN (APN) for general services. Then, the MME 510 generates PDN connection toward the local-gateway so as to generate PDN connection for SIPTO. At this time, as additional considerations, if the corresponding PDN (APN) has an LIPA service permission, after generation of the PDN connection, a notification for the LIPA service may be transferred to the accept message. In such case, the generated PDN connection may be used for both the SIPTO service and the LIPA service. Accordingly, the user of the UE 100 may recognize that the currently generated PDN connection is the same as is achieved through the (e)NodeB and further may apply the LIPA service. However, if the APN does not have any permission for the LIPA service, no notification for LIPA service may be transferred. In such case, the UE 100 may determine whether to transmit traffic for LIPA service depending on whether to receive the permission.

b) Meanwhile, if there is PDN for the previously generated LIPA service, the MME 510 may transmit a deactivation request indicator to request deactivation with substitution for replacing PDN connection that has been generated for the SIPTO service to the UE 100. The deactivation request message means that the PDN for the existing SIPTO service is deleted and is replaced by PDN for an LIPA service that is to be newly generated. Additionally, to associate PDN connection for the SIPTO service to be deleted with PDN connection for LIPA service, the MME 510 may provide information to distinguish, such as APN, bearer id, or LIPA PDN notification.

Alternatively, although there is PDN for the previously generated LIPA service, the MME 510 may configure PDN connection for a separate SIPTO service using APN. For this, the MME 510 releases PDN connection to the core network and transfers a deactivation request message to request deactivation with reactivation to the UE 100. The UE 100 may send the request to the MME 510 using the same PDN (APN) as the PDN (APN) for general services. Then, the MME 510 generates PDN connection toward the local-gateway so as to generate PDN connection for SIPTO.

Table 4 summarizes the operations of the above-described MME.

TABLE 4

MME considers the following matters to initiate SIPTO service.

information of Home (e)NodeB
For example, LIPA available indicator or SIPTO available indicator
subscriber information
information from UE:
whether to accept SIPTO (SIPTO acceptance), which indicates accept or decline Information transmitted from MME information transmitted to Home (e)NodeB or local-gateway:
whether to accept to LIPA (LIPA permission), which instructs LIPA service traffic in case no PDN connection for LIPA service is permitted
information transmitted to UE:
notification for LIPA service
Deactivation request message (which may include APN, bearer ID, etc.) to request deactivation with reactivation 3-4) In Case no PDN for LIPA Service is Generated, the MME 510 Allows no LIPA Service Traffic to be Transmitted/Received Through the Home (e)NodeB or Local-Gateway In general, although the MME 510 determines provision of SIPTO service, but not LIPA service, it assigns a local-gateway for the SIPTO service. As such, if the local-gateway is assigned, a problem may occur that the UE 100 may transmit data to a small network, e.g., home network or corporate network. However, since no LIPA service should be provided, data forwarded through the Home (e)NodeB to the small network, e.g., home network or corporate network should be disregarded or cut off. For this, the MME 510 or SGSN may transmit an LIPA permissible indicator (e.g., LIPA permission indicator) that informs the Home (e)NodeB or local-gateway that no LIPA service is allowed.

Or, the MME 510 or SGSN transfers a filter rule for traffic (e.g., target IP address) passing through a small network, e.g., home network, to the Home (e)NodeB or local-gateway (Local-GW) so that the Home (e)NodeB or the local-gateway may block traffic that attempts to pass through the small network, e.g., home network or corporate network.

Or alternatively, the MME 510 transfers a notification for LIPA service to the UE 100 per PDN or transfers an indicator that indicates no LIPA is allowed or provides an IP flow-based non-acceptance filter so that the UE 100 transfers data based on the filter.

Hereinafter, further detailed description will be provided.

Figure 6:
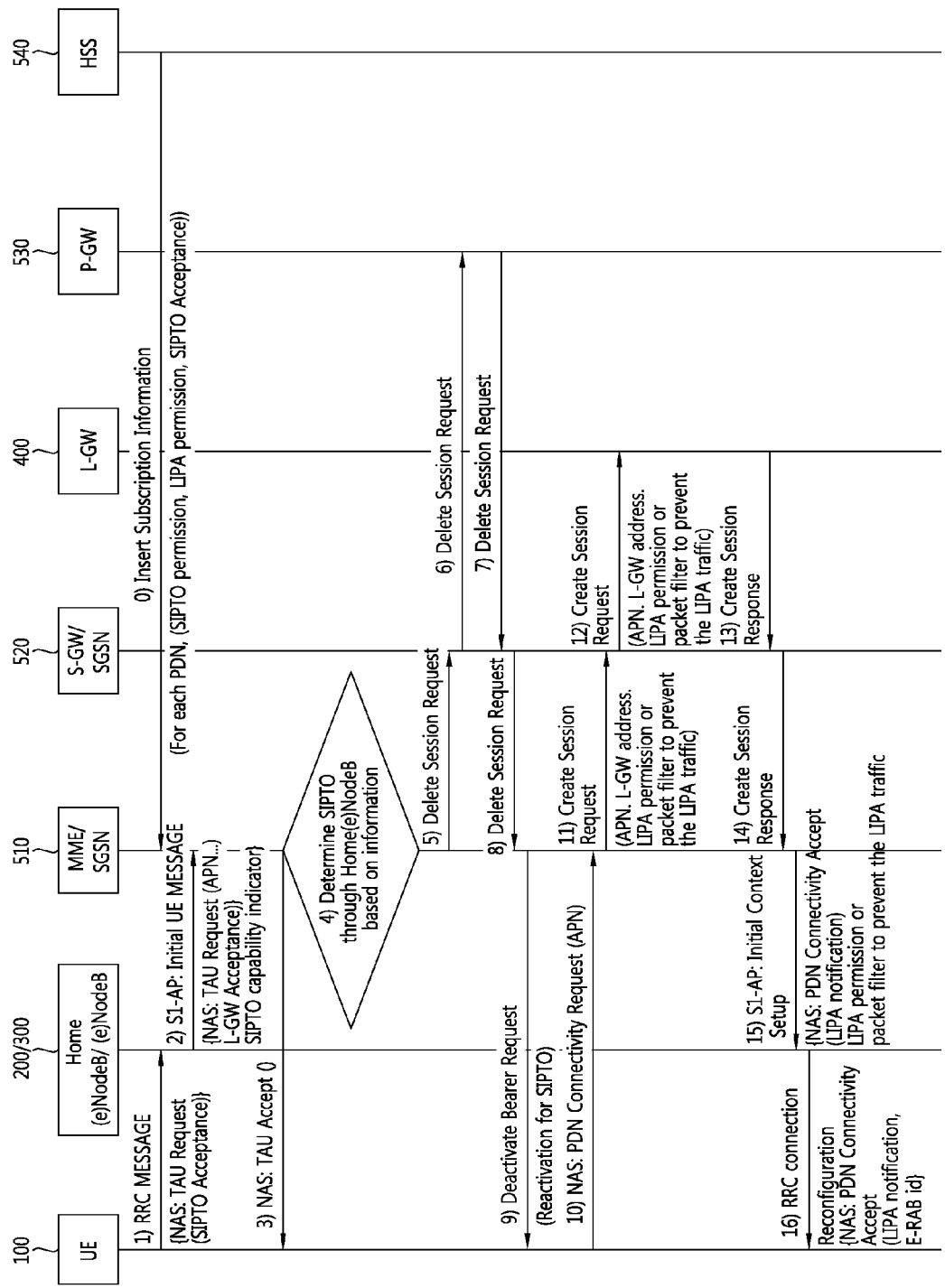
FIG. 6 is a flowchart illustrating a control process for an SIPTO service according to the present invention.
Figure 7:
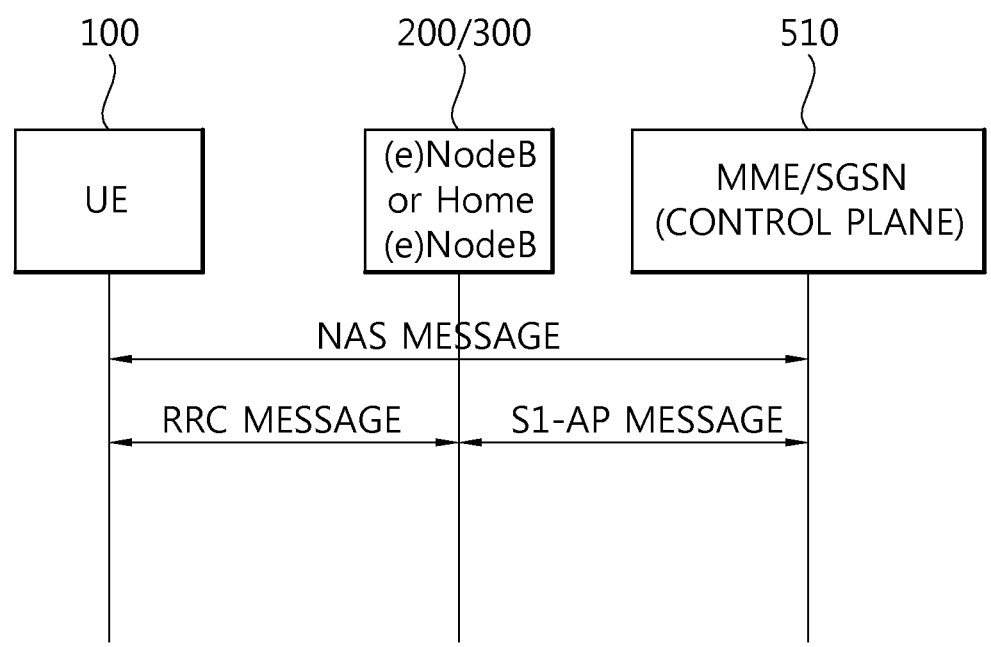
FIG. 7 shows an example of the message protocol shown in FIG. 6.

FIG. 6 is a flowchart illustrating a control procedure for SIPTO service according to the present invention. FIG. 7 illustrates an example of a protocol for the message shown in FIG. 6.

Before specifically describing each procedure referring to FIG. 6, the messages shown in FIG. 6 are briefly described with reference to FIG. 7.

Messages transmitted/received between the UE 100 and the base station, for example, (e)NodeB 200 or Home (e)NodeB 300 are radio resource control (RRC) protocol-based messages. Messages transmitted/received between the base station, e.g., (e)NodeB 200 or Home (e)NodeB 300 and the MME 510 or SGSN (not shown) are S1-AP (S1 application protocol) based messages.

The messages transmitted/received between the UE 100 and the MME 510 or SGSN (not shown) are messages by NAS protocol. The messages by the NAS protocol are encapsulated into the messages by the RRC protocol and the S1-AP messages and then transmitted.

Further, prior to describing the control procedure shown in FIG. 6, parameters included in the shown message will be briefly described.

SIPTO acceptance: indicates whether to accept or decline SIPTO service

L-GW address: address of a local gateway. Indicates whether Home (e)NodeB may provide SIPTO service (SIPTO capability). That is, if the address of a local gateway is included in the message transmitted by the Home (e)NodeB, it means that Home (e)NodeB may provide SIPTO service.

SIPTO capability indicator: SIPTO capability indicator. Indicates whether SIPTO service may be provided.

SIPTO permission: permission of SIPTO service. Indicates whether SIPTO service is permitted.

LIPA permission: permission of LIPA service. Indicates whether LIPA service is permitted.

Packet filter: information transferred from the MME 500 to the Home (e)NodeB or local gateway. A filter through which the Home (e)NodeB or local-gateway transmits or blocks traffic from the UE 100 to a small network, e.g., home network or corporate network.

LIPA notification: notification for LIPA service. Indicates whether LIPA service is permitted or not.

Hereinafter, further detailed description will be provided in conjunction with FIG. 6.

0) First, the MME 510 obtains subscriber information of the UE 100 from the shown HSS 540. The subscriber information of the UE 100 may be set differently for each PDN. The subscriber information configured per PDN may include one or more of the above-described SIPTO permission information, LIPA permission information, and SIPTO accept information on whether the user of the UE 100 has accepted the SIPTO service.

1) Meanwhile, the UE 100 is in IDLE mode and generates an area update request message (e.g., TAU request message) in order to request tacking area update (TAU). The message may include APN indicating the name of an access point through which the UE 100 receives it. The UE 100 encapsulates the area update request message, i.e., TAU request message, in the RRC protocol based message and then transmits the encapsulated message to the (e)NodeB 200 or Home (e)NodeB 300. The attach request message may include SIPTO accept information (e.g., the shown SIPTO acceptance) on whether the user of the UE 100 has accepted the SIPTO service.

2) if the (e)NodeB 200 or Home (e)NodeB 300 receives the RRC message from the UE 100, it extracts the area update request message, i.e., TAU Request message, included in the RRC message, then adds one or more of the address of the local-gateway and SIPTO capable indicator to the extracted message, thereby generating a connection request message, i.e., initial message (e.g., initial UE message), then transmits it to the MME 510. The connection request message, i.e., the initial message, is based on S1-AP. The initial message may be, e.g., an initial UE message as shown.

The connection request message, i.e., the initial message, may further include information of the Home (e)NodeB, e.g., information on CSG ID or capability of Home (e)NodeB, LIPA capability indicator or SIPTO service capability indicator (e.g., SIPTO capability indicator). At this time, since the Home (e)NodeB 300 may support both or either of LIPA or SIPTO, both or either of the two indicators may be included. That is, in case both LIPA and SIPTO are supported, the two parameters are both included.

3) if the MME 510 (or SGSN in case of UMTS) receives the connection request message, i.e., initial message, the area update request message included in the connection request message, i.e., initial message (Initial UE message), i.e., TAU request message (attach request) is extracted. The indicator or information included in the connection request message, i.e., initial message, is extracted. The MME 510 stores the extracted indicator or information.

Then, the MME 510 (or SGSN in case of UMTS) transmits the area update accept message, e.g., TAU Accept message, to the UE 100 through the (e)NodeB 200 or the Home (e)NodeB 300. Specifically, the MME 510 (or SGSN in case of UMTS) encapsulates the area update accept message, e.g., TAU Accept message, based on S1-AP protocol and transmits it to the (e)NodeB 200 or Home (e)NodeB 300. Then, the (e)NodeB 200 or the Home (e)NodeB 300 extracts the area update accept message, e.g., TAU Accept message, from the encapsulated message and encapsulates the extracted message according to the RRC protocol and transfers it to the UE 100.

The above processes 1) to 3) are merely an example, and as an example, a TAU process has been described. However, processes 1) to 3) may be transformed to an radio area update (RAU) procedure, a handover procedure, or an attach procedure. In case of transforming to the RAU procedure, the message sent from the UE 100 may be an RAU request message. In case of transforming to the handover procedure, the message sent from the UE 100 may be a handover request message. Or, in case of transforming to the attach procedure, the message sent from the UE 100 may be an attach request message. As such, RAU, handover, or attach procedures may be easily implemented by those skilled in the art, and further detailed description thereof will be skipped.

4) Subsequently, the MME 510 (or SGSN in case of UMTS) may determine whether to provide SIPTO service to the UE 100 based on one or more of the subscriber information, the stored information or indicator. That is, the MME 510 may determine whether to configure the PDN connection of the UE 100 to pass through the Home (e)NodeB 300 and nodes in the wired network 700 based on one or more of the subscriber information, the stored information or indicator.

Specifically, in case one or more of the address information of the local-gateway and SIPTO capability indicator are included in the TAU request message, the MME 510 determines that the Home (e)NodeB may provide SIPTO service. In case SIPTO accept information is included in the TAU request message and it is determined from the SIPTO accept information that the UE 100 desires to receive SIPTO service, the MME 510 may determine that SIPTO service is to be provided to the UE 100. Further, although there is no SIPTO accept information in the TAU request message, in case it is determined from the obtained subscriber information that the UE 100 hopes to receive SIPTO service, the MME 510 may determine that SIPTO service is to be provided to the UE 100.

At this time, service provider's policy may be additionally considered. Further, the MME 510 may consider QoS of a bearer required for the UE. Specifically, in case the QoS of the bearer configured to pass through nodes included in the wired network 700, such as the public network satisfies the required QoS, the MME 510 may determine that SIPTO service is to be provided to the UE 100.

Meanwhile, based on one or more of the subscriber information, the stored information, or indicator, the MME 510 may additionally determine whether to provide LIPA service to the UE 100.

Further, it may be considered whether the UE 100 is a CSG member of the Home (e)NodeB. Information on the CSG membership may be included in the subscriber information obtained from the HSS 540.

5~6) As such, if it is determined that the bearer of the UE is processed as the SIPTO service, (in other words, the bearer of the UE is determined to pass through the nodes in the wired network 700, such as the public network), the MME 510 transmits a session delete request message, e.g., delete session request message, to the serving gateway (S-GW) 520 or SGSN in order to delete the session that has been previously set between the core network, e.g., serving gateway (S-GW) 520 or SGSN and the PDN gateway (P-GW) 530. Upon receiving the session delete request message, the serving gateway (S-GW) 520 or SGSN transfers the session delete request message to the PDN gateway (P-GW) 530.

7~8) the PDN gateway (P-GW) 530 transfers a response message, e.g., delete session response message, to the serving gateway (S-GW) 520 or SGSN, and the serving gateway (S-GW) 520 or SGSN transfers it to the MME 510 or SGSN.

9) The MME 510 deactivates the existing bearer that has been generated by the UE 100 and transfers a bearer deactivation request message for deactivation with reactivation for the SIPTO. The bearer deactivation request message may include a cause value, e.g., indicator instructing reactivation for SIPTO, e.g., reactivation for SIPTO.

10) Then, the UE 100 transmits a PDN connection request message to the MME 510. The PDN connection request message includes APN that indicates the name of the access point through for the UE 100's reception. At this time, the UE 100 may include, in the connection request message, the same PDN (APN) as the PDN (APN) for general services.

11) Then, the MME 510 transmits the APN and a session generation request message, e.g., create session request, including the address (L-GW address) of the local-gateway to the serving gateway (S-GW) 520 in order to generate PDN connection for SIPTO.

Meanwhile, in case it is determined whether LIPA service is to be provided to the UE 100 based on one or more of the subscriber information, the stored information or indicator in the process 4), the MME 510 may include LIPA permission or packet filter information in the session generation request message depending on the determination. That is, in case LIPA service is to be provided to the UE 100, the MME 510 may include the LIPA permission in the session generation request message. If it is determined that no LIPA service is to be provided to the UE 100, the MME 510 does not include the LIPA permission and may include only the filter information in the session generation request message.

Alternatively, in case in process 4) it is not yet determined whether to provide LIPA service to the UE 100, when receiving the PDN connection request message from the UE 100, such determination may be made.

12) Upon receiving the session generation request message, the serving-gateway (S-GW) 520 identifies parameters included in the session generation request message—address of the local-gateway. If there is the parameter, e.g. the address of the local-gateway, the session generation request message is transferred to the local-gateway 400.

At this time, the local-gateway 400 identifies whether one or more of the LIPA permission or filter information are included in the session generation request message. If there is the LIPA permission included, in case the data received from the UE 100 is oriented later toward a small network, e.g., home network or corporate network, connected to the local-gateway 400, this is allowed. However, in case no LIPA permission is included or the filter information is included, if the data received from the UE 100 is later oriented toward the small network, e.g., home network or corporate network, connected to the local-gateway 400, such data may be blocked.

13~14) the local-gateway 400 transfers the session generation response message, e.g., create session response message, to the serving gateway 520 and the serving gateway transfers it to the MME 510.

15) Upon receiving the session generation response message, the MME 510 generates a connection accept message (e.g., connectivity accept message). The generated message may be based on the NAS protocol. At this time, the MME 510 determines whether to permit the LIPA service to the UE 100 and depending on such determination may include a notification for the LIPA service in the generated message.

Subsequently, the MME 510 encapsulates the generated message in the S1 AP based initial context setup response message. At this time, the MME 510 may include one or more of LIPA permission and packet filter information in the initial context setup response message depending on the determination on whether to permit the LIPA service to the UE 100.

Subsequently, the MME 510 transmits the initial context setup response message to the Home (e)NodeB 300.

16) when receiving the initial context setup response message, the Home (e)NodeB 300 extracts the connection accept message and encapsulates the extracted connection accept message in the RRC connection reconfiguration message.

Further, the Home (e)NodeB 300 may include all or some of the parameters included in the initial context setup response message in the RRC connection reconfiguration message. Further, one or more of the parameters included in the received connection accept message may be excluded or one or more information or parameters may be included. As an example, FIG. 6 shows an example where in addition to a notification parameter (e.g., LIPA notification) for the LIPA service, E-RAB id parameter is included in the connection accept message.

The Home (e)NodeB 300 transmits the RRC connection reconfiguration message to the UE 100.

Meanwhile, the Home (e)NodeB 300 extracts and stores one or more of the LIPA notification parameter, LIPA permission or filter information included in the connection accept message. Then, the Home (e)NodeB 300 determines whether LIPA service is permitted to the UE 100 based on one or more of the LIPA notification parameter and LIPA permission. If no LIPA service is permitted, although receiving data from the UE 100 to a small network, e.g., home network or corporate network, the Home (e)NodeB 300 disregards or blocks such traffic. Further, upon receiving data from the UE 100 to the small network, e.g., home network or corporate network, the Home (e)NodeB 300 blocks or disregards such traffic depending on the filter rule.

Meanwhile, upon receiving the RRC connection reconfiguration message, the UE 100 may transmit the RRC connection reconfiguration complete message to the Home (e)NodeB 300.

Then, the UE 100 identifies whether the notification parameter (e.g., LIPA notification) for the LIPA service is included in the RRC connection reconfiguration message, and if any, verifies the notification parameter for the LIPA service. In case LIPA service is not allowed by the notification parameter for the LIPA service, the UE 100 does not generate data oriented toward a small network, e.g., home network or corporate network, through the Home (e)NodeB 300 or although such data is generated, does not transfer the data.

As described above, in FIG. 6, the MME 510 and the S-GW 520 are shown based on EPC, but the present invention may also apply to UMTS. In case of UMTS, the MME 510 and the S-GW 520 both may be integrated with SGSN. Accordingly, no signal transmission/reception is done between the MME 510 and the S-GW 520 shown in FIG. 6, and is processed in the SGSN.

Figure 8:
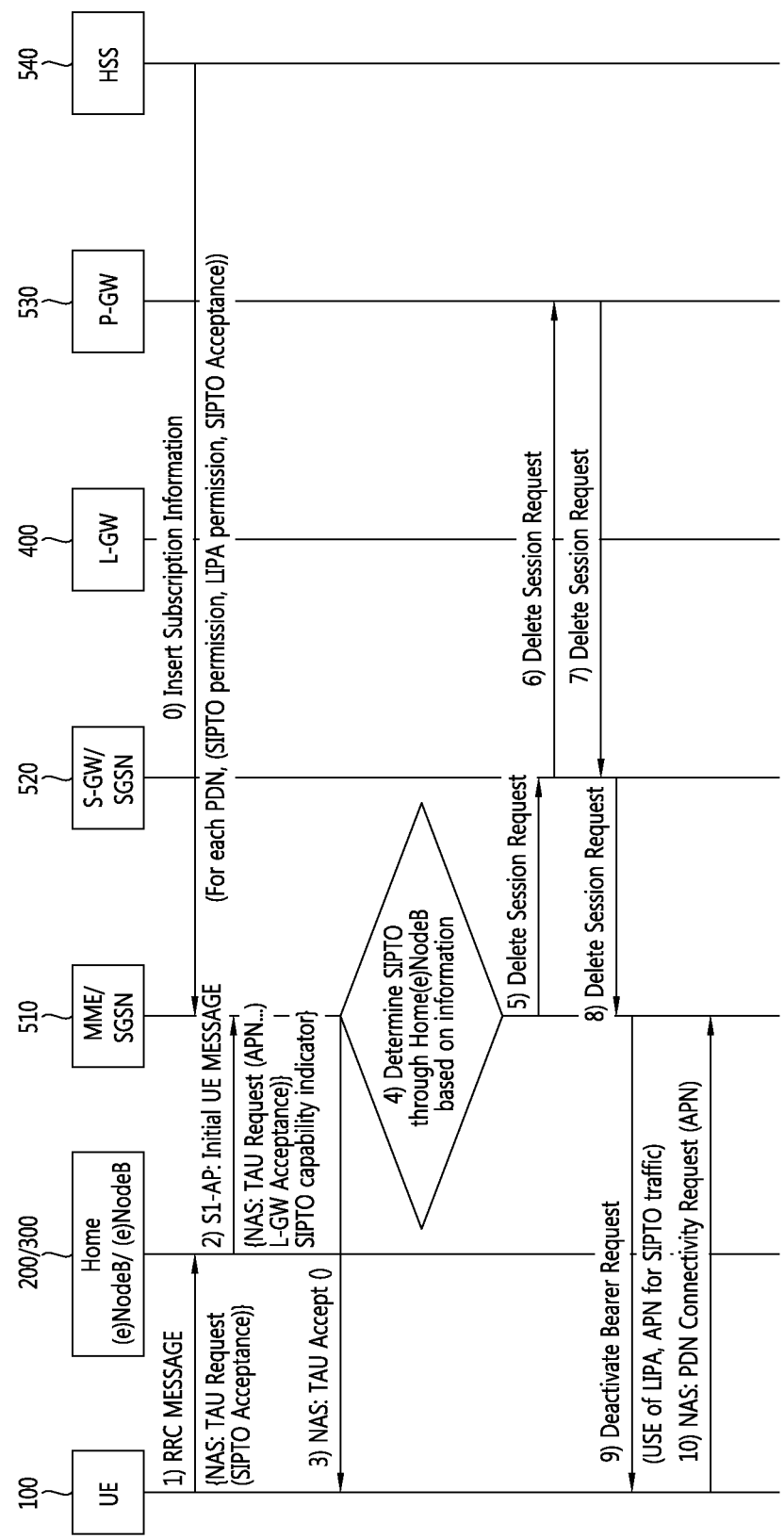
FIG. 8 is another flowchart illustrating a control process for an SIPTO service according to the present invention.

FIG. 8 is a flowchart illustrating a control process for an SIPTO service according to the present invention.

Some processes of FIG. 8 are similar to some processes of FIG. 6. Hereinafter, the description primarily focuses on the differences and the same description as made in connection with FIG. 6 is skipped.

The flowchart shown in FIG. 8 assumes that unlike FIG. 6 the UE 100 has been receiving LIPA service. That is, it is assumed that there is a session previously generated between the serving gateway (S-GW) and the local-gateway 400 for LIPA service.

Processes 1)~8) are similar to processes 1)~8) of FIG. 6.

9) the MME 510 transfers a bearer deactivation request message to request deactivation with substitution so that the bearer previously generated for LIPA service be replaced with a bearer for SIPTO. The bearer deactivation request message may include use of LIPA parameter.

10) Then, the UE 100 transmits the PDN connection request message to the MME 510. The PDN connection request message includes APN indicating the name of an access point for the UE 100 to receive it. At this time, the UE 100 may include, in the connection request message, the same PDN (APN) as the PDN (APN) for general services.

Besides, processes 11)~16) shown in FIG. 6 may be likewise performed.

The above-described methods according to the present invention may be implemented in software, hardware, or a combination thereof. For example, the methods according to the present invention may be stored in a storage medium (e.g., internal memory, flash memory, hard disk, etc.) and may be implemented in codes or commands in a software program that may be executed by a processor, such as a microprocessor, controller, micro controller, or ASIC (Application Specific Integrated Circuit). This will be described with reference to FIG. 9.

Figure 9:
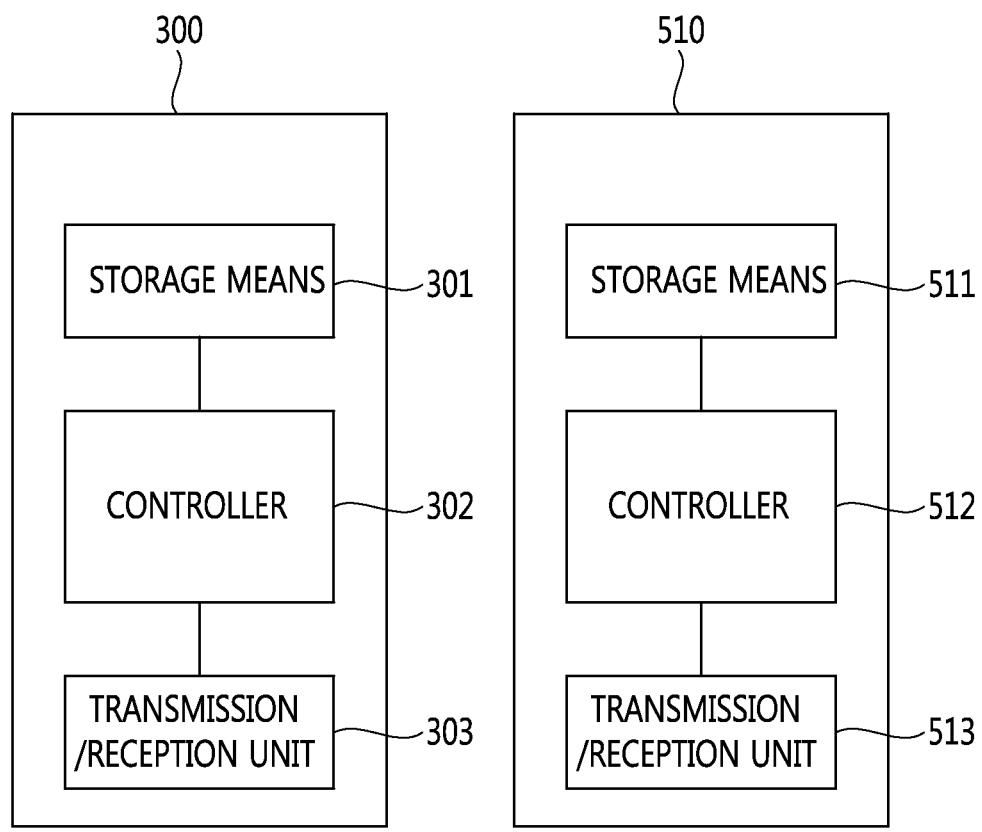
FIG. 9 is a block diagram illustrating the configuration of an Home (e)NodeB 300 and an MME 510 according to the present invention.

FIG. 9 is a block diagram illustrating the configuration of the Home (e)NodeB 300 and the MME 510 according to the present invention.

As shown in FIG. 9, the Home (e)NodeB 300 includes a storage means 301, a controller 302, and a transmission/reception unit 303. The MME 510 includes a storage means 511, a controller 512, and a transmission/reception unit 513.

The storage means 301 and 511 stores the methods shown in FIGS. 6 to 8.

The controllers 302 and 512 control the storage means 301 and 511 and the transmission/reception 303 and 513. Specifically, the controllers 302 and 512 execute the methods stored in the storage means 301 and 511. The controllers 302 and 512 transmit the above-described signals through the transmission/reception units 303 and 513.

Although the embodiments of the present invention have been described thus far, the scope of the present invention is not limited to the specific embodiments, and rather various modifications or variations may be made without departing from the scope of the present invention defined by the appending claims.

What is claimed is:

1. A method of controlling a service in a server in charge of a control plane in a mobile communication network, the method comprising:
receiving, by the server, an initial message including both an identifier of a local gateway and an selected IP traffic offload (SIPTO) service-related indicator from a Home (e)NodeB, the initial message being an S1 application protocol (S1-AP) based message and including a request message from a user equipment (UE) in an idle mode, the request message of the UE in the idle mode corresponding to at least one of a tracking area update (TAU) request message, a radio area update (RAU) request message, and an attach request message, and each of the TAU request message, the RAU request message, the attach message from the UE in idle mode including information indicating whether the UE approves a provision of the SIPTO service or not;
upon receiving the initial message, determining whether to provide the SIPTO service to the UE in consideration of all of the information indicating whether the UE approves the provision of the SIPTO service or not, the identifier of the local gateway, and the SIPTO service-related indicator;
when it is determined to provide the SIPTO service to the UE, determining whether to block a local IP access (LIPA) service to the UE;
when it is determined to provide the SIPTO service and to block the LIPA service to the UE, and when there exists a bearer previously generated for the LIPA service, transmitting, to the UE, a bearer deactivation request message to substitute the bearer previously generated for the LIPA service with a bearer for the SIPTO service;
when it is determined to provide the SIPTO service and to block the LIPA service to the UE, transmitting LIPA service permission information and LIPA filter information to the local gateway; and
when it is determined to provide the SIPTO service and to block the LIPA service to the UE transmitting all of the LIPA service permission information, the filter information, and a notification for the LIPA service to the Home (e)NodeB,
wherein the LIPA service permission information is used to inform the Home (e)NodeB and the local gateway that the LIPA service is not permitted,
wherein the filter information is used by the Home (e)NodeB and the local gateway to block data from the LIPA service generated by the UE, and to bypass data from only the SIPTO service generated by the UE, and
wherein the notification for the LIPA service is used to inform the UE that the LIPA service is not permitted.

2. The method of claim 1, wherein:
the SIPTO service-related indicator indicates whether the Home (e)NodeB is able to provide the SIPTO service; and
the LIPA service permission information indicates whether provision of the LIPA service to the UE is permitted.

3. The method of claim 1, wherein the information on whether to accept the SIPTO service by the UE is included in the request message of the UE and received, or is obtained from subscriber information.

4. The method of claim 1, wherein the LIPA service permission information or filter information transmitted to the local gateway is included in a session generation request message and transmitted.

5. The method of claim 1, wherein one or more of the LIPA service permission information, the LIPA filter information, and the notification for the LIPA service transmitted to the Home (e)NodeB are included in a connection acceptance message and transmitted.

6. The method of claim 1, further comprising, after the determination:
   transmitting a session delete request message to a serving gateway;
   receiving a session delete response message from the serving gateway;
   receiving a connection request message from the UE,
   wherein after receiving the connection request message from the UE, the transmitting to the Home (e)NodeB and the transmitting to the local gateway are performed.

7. The method of claim 1, wherein if the bearer deactivation request message is transmitted to the UE, a message that requests deletion of existing packet data network (PDN) connection and reconnection is transmitted or a message that requests deletion of the existing PDN connection and use of existing LIPA PDN is transmitted.

8. A server of controlling a service, the server in charge of a control plane in a mobile communication network, the server comprising:
   a transmission/reception unit configured for receiving an initial message including both an identifier of a local gateway and an selected IP traffic offload (SIPTO) service-related indicator from a Home (e)NodeB, the initial message being an S1 application protocol (S1-AP) based message and including a request message from a user equipment (UE) in an idle mode, the request message of the UE in the idle mode corresponding to at least one of a tracking area update (TAU) request message, a radio area update (RAU) request message, and an attach request message, and each of the TAU request message, the RAU request message, the attach message from the UE in idle mode including information indicating whether the UE approves a provision of the SIPTO service or not; and
   a controller configured for:
      upon receiving the initial message, determining whether to provide the SIPTO service to the UE in consideration of all of the information indicating whether the UE approves the provision of the SIPTO service or not, the identifier of the local gateway, and the SIPTO service-related indicator; and
      when it is determined to provide the SIPTO service to the UE, determining whether to block a local IP access (LIPA) service to the UE,
   wherein the transmission/reception unit is further configured for:
      when it is determined to provide the SIPTO service and to block the LIPA service to the UE, and when there exists a bearer previously generated for the LIPA service, transmitting, to the UE, a bearer deactivation request message to substitute the bearer previously generated for the LIPA service with a bearer for the SIPTO service;
      when it is determined to provide the SIPTO service and to block the LIPA service to the UE, transmitting LIPA service permission information and LIPA filter information to the local gateway, and
      when it is determined to provide the SIPTO service and to block the LIPA service to the UE, transmitting all of the LIPA service permission information, the LIPA filter information, and a notification for the LIPA service to the Home (e)NodeB,
   wherein the LIPA service permission information is used to inform the Home (e)NodeB and the local gateway that the LIPA service is not permitted,
   wherein by the Home (e)NodeB and the local gateway to block data from the LIPA service generated by the UE, and to bypass data from only the SIPTO service generated by the UE, and
   wherein the notification for the LIPA service is used to inform the UE that the LIPA service is not permitted.

9. The server of claim 8, wherein:
   the SIPTO service-related indicator indicates whether the Home (e)NodeB is able to provide the SIPTO service; and
   the LIPA service permission information indicates whether provision of the LIPA service to the UE is permitted.

10. The server of claim 8, wherein the information on whether to accept the SIPTO service by the UE is included in the request message of the UE and received, or is obtained from subscriber information.

11. The server of claim 8, wherein the LIPA service permission information or filter information transmitted to the local gateway is included in a session generation request message and transmitted.

12. The server of claim 8, wherein one or more of the LIPA service permission information, the LIPA filter information, and the notification for the LIPA service transmitted to the Home (e)NodeB are included in a connection acceptance message and transmitted.

* * * * *